United States Patent Office 3,446,759

Patented May 27, 1969

1

3,446,759

RECLAMATION OF COPOLYMERS OF TETRAFLUOROETHYLENE AND TRIFLUORONITROSOMETHANE BY NITRIC ACID DIGESTION

Nathan B. Levine, Colonia, N.J., and Harris Krainman, Canoga Park, Calif., assignors to Thiokol Chemical Corporation, Bristol, Pa., a corporation of Delaware

No Drawing. Filed June 14, 1966, Ser. No. 557,354
Int. Cl. C08f *47/24, 27/26*
U.S. Cl. 260—2.3 6 Claims

This invention relates to reclamation of amine-cured nitroso rubber. More particularly, this invention relates to a method for reclaiming the amine-cured copolymer of tetrafluoroethylene and trifluoronitrosomethane.

Commercial usage of nitroso rubber is extensive because it has excellent resistance to many chemicals and solvents, outstanding low-temperature flexibility, flame-extinguishing characteristics, and other desirable properties. However, the material is relatively expensive and has limited pot life (i.e., the time within which a material may be worked after the ingredients are mixed), particularly where the copolymer is cured with an amine such as triethylenetetramine. Heretofore there has been considerable waste of money, time and material when a batch of nitroso rubber was lost because of premature curing. The disclosed process avoids such waste by returning the rubber to a state from which it may be reprocessed to yield a vulcanizate whose properties are comparable to those of the original cured material.

It is accordingly a primary object of this invention to provide a method for reclaiming amine-cured nitroso rubber.

A further object of this invention is to provide an economical method for reclaiming the amine-cured copolymer of tetrafluoroethylene and trifluoronitrosomethane.

Another object is to provide a method for returning amine-cured nitroso rubber to a state where it can advantageously be reprocessed.

In accordance with the invention, the cured nitroso rubber is first reduced to small pieces on a rubber mill or other standard grinding equipment. It is then contacted with concentrated nitric acid, which is believed to destroy the crosslinking present in the cured rubber. The material is then washed with water, its pH adjusted to neutrality with sodium bicarbonate and acetic acid, and rewashed. The neutralized material is dried in a vacuum oven at 150° F., after which it is remilled. After this step the polymer is ready to be reprocessed in the same manner as was the original material; i.e., by adding the amine curing agent, blending, and curing by heating.

The procedure is further illustrated in the following example.

EXAMPLE I

An 83 g. portion of amine-cured nitroso rubber was milled in a rubber mill, reducing the particle size of the

2 elastomer to a crumb of about one half inch diameter or less. The material was then digested in 70% $HNO_3$ for 6 hours at 150° F., with vigorous agitation. Thereafter the material was washed with water and its pH adjusted to neutrality with sodium bicarbonate and acetic acid. The neutralized material was rewashed and dried under vacuum at 150° F. The yield was 74 g. Finally, the material was again milled to give a homogeneous product.

The reclaimed material was reprocessed by the addition of triethylenetetramine and Quso H40 (a powdered silicon dioxide reinforcing filler manufactured by Philadelphia Quarty Company), blending on a roll mill, curing for 1 hour at 200° F., and postcuring for 18 hours at 212° F. The properties of the original cured rubber and the reprocessed cured rubber were as follows:

| | Original | Reclaimed |
|---|---|---|
| Tensile strength, p.s.i. | 520 | 460 |
| Elongation, percent | 600 | 600 |
| 200% modulus, p.s.i. | 230 | 170 |
| Hardness, Shore A Durometer | 50 | 50 |

What is claimed is:

1. A process for reclaiming amine-cured nitroso rubber, comprising:
comminuting vulcanizate of copolymer of tetrafluoroethylene and trifluoronitrosomethane;
digesting said vulcanizate with sufficient concentrated nitric acid to obtain a digested revulcanizable material;
washing, neutralizing, rewashing and drying said digested material; and
milling the product thus obtained.

2. A process as defined in claim 1 wherein said vulcanizate is comminuted to a particle size of about one half inch diameter or less.

3. A process as defined in claim 2 wherein said product is milled to a homogeneous mass.

4. A process as defined in claim 3 wherein said nitric acid has a concentration of about 70% by weight acid.

5. A process as defined in claim 4 wherein said neutralizing is effected with sodium bicarbonate and acetic acid.

6. A process as defined in claim 1 wherein said vulcanizate is vigorously agitated during the digesting step.

References Cited

UNITED STATES PATENTS 3,268,479 8/1966 Martel ---------- 260—59
3,291,761 12/1966 Griffin ---------- 260—2.3

MURRAY TILLMAN, *Primary Examiner.*

M. J. TULLY, *Assistant Examiner.*

U.S. Cl. X.R.

260—92.1